United States Patent [19]
Baker et al.

[11] Patent Number: 5,204,652
[45] Date of Patent: Apr. 20, 1993

[54] ADJUSTABLE BLEED SYSTEM FOR A UNIVERSAL SOLENOID FOR FLUID CONTROL VALVES

[75] Inventors: John M. Baker, Corona; Ronald C. Jess, Garden Grove, both of Calif.

[73] Assignee: National Irrigation Specialists, Inc., Anaheim, Calif.

[21] Appl. No.: 706,347

[22] Filed: May 28, 1991

Related U.S. Application Data

[62] Division of Ser. No. 616,214, Nov. 20, 1990.

[51] Int. Cl.⁵ .......................... H01F 7/08; F16K 31/02
[52] U.S. Cl. ..................................... 335/238; 335/258; 251/129.03
[58] Field of Search ............... 335/239, 238, 240, 164, 335/61, 253; 251/129.03, 129.15; 137/583, 589

[56] References Cited

U.S. PATENT DOCUMENTS

| | | | |
|---|---|---|---|
| 1,167,815 | 1/1916 | Gold | 251/129.02 |
| 1,175,864 | 3/1916 | Gold | 251/129.02 |
| 1,822,668 | 9/1931 | Protzeller | 251/129.18 |
| 3,236,494 | 2/1966 | Frantz | 251/129.03 |
| 3,351,093 | 11/1967 | Frantz | 251/129.03 |
| 3,932,826 | 1/1976 | Read, Jr. | 335/240 |
| 4,598,736 | 7/1986 | Chorkey | 251/129.03 |
| 4,603,832 | 8/1986 | Sjoquist | 251/129.03 |
| 4,896,127 | 1/1990 | Hida | 335/239 |

Primary Examiner—Leo P. Picard
Assistant Examiner—Raymond Barrera
Attorney, Agent, or Firm—G. Donald Weber, Jr.

[57] ABSTRACT

A solenoid valve comprising with a plunger which is readily and accurately adjustable to various heights whereby the solenoid is able to function with virtually all fluid flow control systems. The solenoid includes an elongated base which may have multiple threads to accommodate a variety of connectors and a bleed screw formed to be minimally disruptive to the electromagnetic field. A measurement standard, in the form of a cylinder and piston combination, is shaped to fit within the solenoid body and accurately determine the desired length of the specific plunger. The piston is mounted to move in the cylinder and, in conjunction with the cylinder, to assume the exact length required for the plunger within the solenoid to function correctly in operating the valve. The plunger is adjustable which allows the height thereof to be precisely and securely set to the height determined by the measurement standard.

20 Claims, 1 Drawing Sheet

U.S. Patent
Apr. 20, 1993
5,204,652
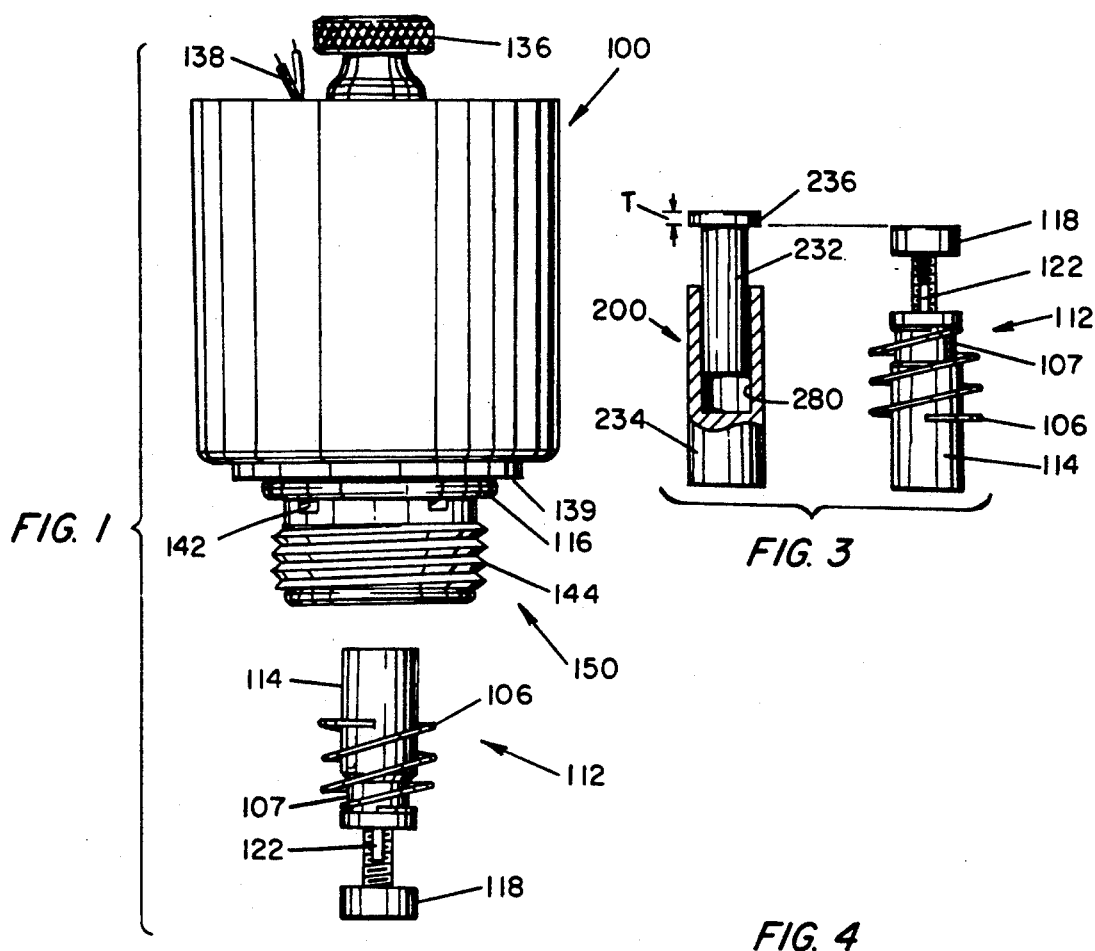
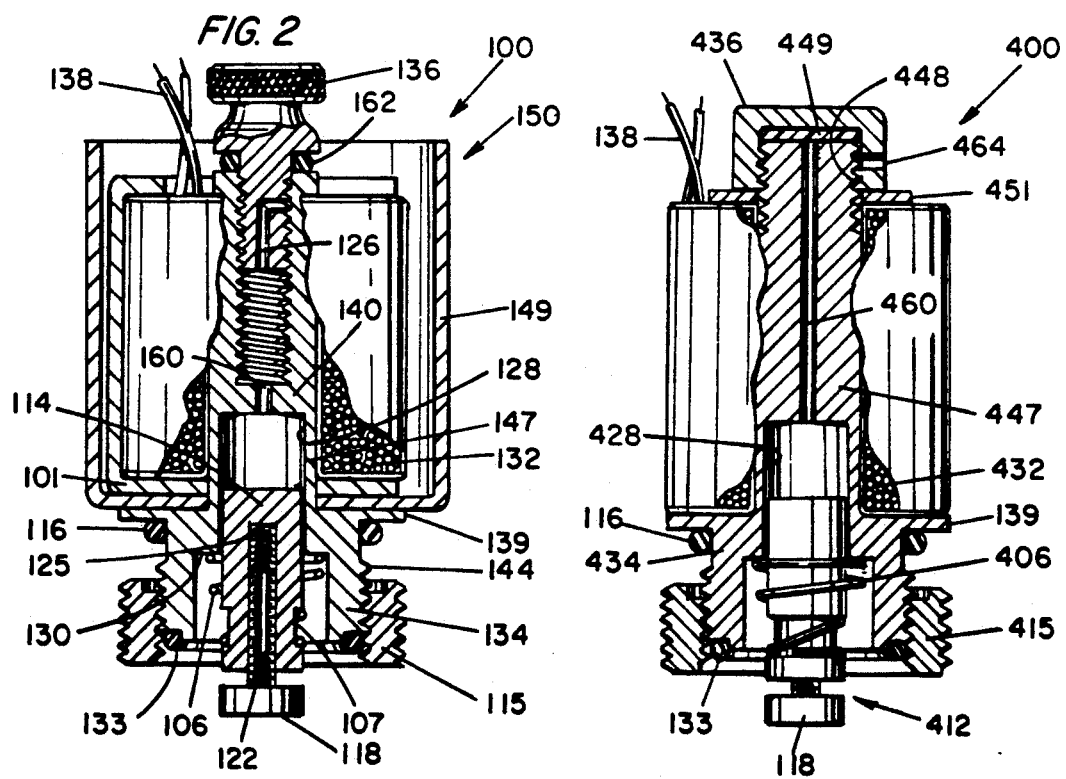

5,204,652

ADJUSTABLE BLEED SYSTEM FOR A UNIVERSAL SOLENOID FOR FLUID CONTROL VALVES

This is a division of application Ser. No. 07/616,214, filed Nov. 20, 1990.

BACKGROUND

1. Field of the Invention

This invention is directed to solenoids, in general, and to an improved solenoid which is adaptable to operate the valves in most irrigation systems by means of a versatile, yet simple, adjustment to the novel plunger thereof, in particular.

2. Prior Art

A wide variety of irrigation systems and other fluid control systems are known. These systems usually contain valves which are opened and closed by means of a solenoid, thereby controlling the flow or non-flow of water or other fluids. The valves of the existing systems have fluid constantly being delivered by pipes or other usual means. The solenoid controlled valve is positioned at a desired place in the fluid flow pattern such that it is able to stop or permit the fluid flow selectively. Typically, the solenoid includes a coil and a plunger which is controlled by signals supplied to the coil. The signals are supplied, by a control panel which is usually remote from the solenoid. Normally, a signal is supplied to the solenoid to move the plunger relative to the coil. Movement of the plunger operates to control the valve in the irrigation system. When the coil within the solenoid is activated, the plunger, typically, is pulled into the solenoid toward the coil by the electromagnetic force produced at the coil. Typically, this operation moves the plunger off the solenoid discharge port within the valve, thereby permitting the water pressure to force the valve open. When the signal to the coil ceases, the plunger is pushed by a spring to a position extended from the solenoid. In this extended position, the plunger blocks the fluid flow by moving onto the solenoid discharge port, i.e., the valve is closed. Of course, whenever a solenoid ceases to function properly, the valve may be "frozen" shut and no fluid is delivered to the system. Conversely, the valve may remain in the open (or partially open) condition and constantly leak fluid. Neither of these arrangements is satisfactory and, usually, the only solution currently available is to replace the entire valve or, at least the entire solenoid in the valve.

When an irrigation system uses only one model of valve or solenoid, the replacement of a solenoid can be a relatively simple task, assuming the part is still available from the manufacturer. In more complex irrigation systems which have been installed over time and/or under the direction of several individuals, there is likely to be more than one type of equipment present. In both of these situations, replacing a solenoid can become a futile act of trying to find the matching manufacturer replacement. Some solenoids are difficult to obtain. Other solenoids are impossible to obtain because they are no longer manufactured Those persons in charge of irrigation systems may, therefore, find it necessary to keep a large and varied inventory of solenoids on hand to be able to promptly replace those which fail before the flora is damaged, the location is flooded, or the like.

Maintaining such an inventory of solenoids is not only costly, but requires much storage space and complex record keeping to maintain an adequate supply. Moreover, the inventory is, eventually, depleted and the problem of obtaining proper solenoids recurs.

One of the most irksome and expensive parts of the replacement process is the frustrating attempt to replace a solenoid even when large inventories are available. Typically, the irrigation specialist takes a dozen of the most likely types of solenoids into the field for repair and/or replacement. This inefficient operation can be even more exasperating if the specialist finds that none of the units is appropriate. Now a return trip must be made to obtain the correct model of solenoid, assuming that it is even available. Then another service trip is made into the field to finally do the actual replacement work. Thus, the replacement process becomes even more expensive and time consuming.

The difficulty of the replacement process was somewhat reduced by the introduction of a solenoid which has three different height replacement plungers. This multiple-plunger solenoid is sold under the trademark SUPER MAX. (SUPER MAX is a trademark of National Irrigation Specialists of Anaheim, Calif.). In this solenoid, a plurality of interchangeable plungers of different lengths is provided. To implement this system, a chart is provided with the SUPER MAX solenoid which keys each of the different plungers to specific irrigation systems.

While this solenoid was a vast improvement over the huge inventory method of solenoid preparedness, it is still cumbersome, requiring a chart and extensive parts inventory. For example, in any replacement at least two of the three plungers will be unnecessary.

In addition, the SUPER MAX solenoid is made to cover a broad spectrum of valves with only three fixed dimension plungers. The valve models produced by the different manufacturers vary slightly. In addition, the variations between different brands of irrigation systems frequently results in a less than perfect fit of these "general-fit" plungers. The nature of each plunger is to cover more than one type of valve and, therefore, is like the proverbial "Jack of all trades and master of none". The fit of the plunger is frequently good, but not perfect in many situations. For example, if the plunger is too short, the magnetic field within the body of the solenoid is unable to "capture" the plunger, pull it up and thereby open the valve. Conversely, if the plunger is too long, the valve is always closed because there is no space in which it may move toward the magnetic field and thereby open the valve.

Although solenoids of irrigation systems are discussed above, any fluid control system which includes the use of valves and electrically activated solenoids has comparable difficulties. There is clearly a need for a precisely fitted solenoid which will serve as a replacement in any irrigation or fluid control system. Such a solenoid will provide the additional benefits of reduced inventory and associated costs, lower labor costs because repeat trips to the field are unnecessary, and elimination of the problem of unavailable solenoid models.

PRIOR ART STATEMENT

No formal prior art search has been made but reference to the SUPER MAX device is noted supra.

SUMMARY OF THE INSTANT INVENTION

The instant invention is directed to a solenoid which is versatile and useful. The solenoid includes an activating coil and a plunger moveably mounted within the activating coil. The plunger can be adjusted to virtually any height thereby making the solenoid of the instant invention adaptable to valves within virtually all irrigation systems.

The threaded base of the solenoid permits the solenoid to be mounted at the valve. The threaded base is elongated to accomodate the plunger of the invention. The threaded base of the solenoid may have multiple pitch threads which enables the solenoid to be used with a variety of valves having different threads.

The solenoid includes a bleed screw which allows the water pressure on the discharge port of the valve to be reduced, thereby permitting the valve to open. The bleed screw of the invention is uniquely constructed to minimally disrupt the electromagnetic field created by the actuating coil yet effectively relieving the water pressure.

The preferred embodiment of the invention includes a two piece plunger. The two piece plunger includes a main body which fits within the solenoid coil in a conventional manner. The main body includes an axial bore therein which is threaded on the inner surface thereof. The main body is as long as possible to insure that there is sufficient ferrous material present for the electromagnetic field created to be able to capture the plunger. A second body is adapted to engage the threaded surface of the axial bore of the main body. Thus, the overall length of the plunger can be adjusted by the screw action of the threaded members.

In one embodiment of the invention, the adjustable plunger has a nylon strip inserted in a slot in the threaded tail of the second body. The strip stabilizes and substantially locks the plunger parts in place thereby maintaining a fixed position and plunger length.

The instant invention also includes a measurement standard composed of a hollow tube with a flat-headed piston snugly, but slideably, fitted therein. Thus, the piston slides within the tube but tends to remain in a fixed position relative to the tube. The thickness of the flat head of the piston is precisely equal to the length of travel necessary to permit opening and closing the valve by movement of the plunger within the solenoid. This measurement standard is used to determine the proper height of the adjustable plunger to be used by the replacement solenoid.

In operation, the measurement standard is fully extended and placed into the plunger aperture axially disposed within the solenoid body. The solenoid is then fully assembled and positioned onto the valve. When the solenoid is positioned on the valve, the piston of the measurement standard is compressed into the tube so that the standard assumes the exact height of the plunger space. The solenoid is removed from the valve and the measurement standard removed from the solenoid.

The measurement standard and the adjustable plunger are compared. The plunger is manipulated until the top of the head is flush with the base of the flat head of the piston of the standard. The properly sized plunger is placed within the solenoid body which is now assembled and positioned on the valve.

BRIEF DESCRIPTION OF THE DRAWINGS

FIG. 1 is an exploded view of the solenoid.

FIG. 2 is a partially cut-away, partially cross-sectional view of the solenoid with the adjusted plunger in the core.

FIG. 3 is a side view of the measurement standard beside a properly adjusted plunger.

FIG. 4 is a partially cut-away, partially cross-sectional view of the solenoid of another embodiment of the invention.

DESCRIPTION OF THE PREFERRED EMBODIMENT

Referring now to FIGS. 1 and 2 concurrently, there is shown one embodiment of the instant invention. The solenoid 100 includes a main body 150 and a movable armature or plunger 112 associated therewith. In the preferred embodiment, the main body 150 includes a support core 147. The core 147 includes an axial aperture 128 which is shaped to slideably accomodate armature 112. In the embodiment shown, both the plunger 112 and aperture 128 are cylindrically shaped, although other shapes such as hexagonal, rectangular, and the like can be utilized. A bleed screw 136 is provided at the other end of the support core 147.

In the embodiment shown, the actuating coil 132 formed on bobbin 101 or similar support and is removeably mounted on the core 147. However, coil 132 may be an integral part of main body 150 of the solenoid as is commonly known in the art. An external housing 149 can be used to enclose the coil 132. The coil 132 can be potted within the housing 149 (or on bobbin 101) in a conventional manner. Electrical wires 138 are used to connect actuating coil 132 to an external power source. When power is supplied to the coil 132 through wires 138, an electromagnetic field is created at core 147 which is operative to capture and move plunger 112 within aperture 128.

An enlarged base 134 is provided at one end of core 147. The base 134 includes shoulder 139 which supports coil 132. The base 134 includes an externally threaded base portion 144. In the embodiment shown, the base 134 includes apertures 142 for receiving solenoid removal tools. Of course, apertures 142 may have any suitable shape, such as oval, hexagonal, or the like The apertures 142 may even be omitted.

In a preferred embodiment, threaded base portion 144 includes multiple pitch threads. This enables the threaded base portion 144 to engage a variety of connectors or valves which may have different thread pitches. Of course, a base with a single thread pitch may be used. In addition, as shown in FIG. 2, an adapter 115 can be utilized. The adapter 115 is an annular ring which is threaded on the inner and outer surfaces The inner surface threads are adapted to engage the threads on the threaded base portion 144. The outer threads of adapter 115 are adapted to engage the threads on a valve. The adapter permits the solenoid to be used with valves having different size openings.

In addition, an O-ring 116 is mounted at the exterior of the threaded base portion 134 adjacent to the shoulder 139. The O-ring 116 can be used to provide a suitable seal for the solenoid whether the adapter 115 is utilized or not. That is the O-ring 116 can be sealed against the upper edge of the valve, per se, or the upper edge of the adapter 115 if so utilized.

In addition, an O-ring 133 can be mounted at the outer edge of the threaded base portion 144 (or at the inner surface of adapter 115) in order to provide a suitable seal between the core 147 and the adapter 115. This O-ring 133 provides another measure of sealing for the apparatus, especially when the adapter 115 is utilized.

The opposite end of the core 147 is also threaded to receive a bleed screw 136 for permitting spurious water to be vented from the solenoid. In the embodiment shown in FIGS. 1 and 2 the upper end of aperture 128 is internally threaded. The upper end of aperture 128 can be of smaller diameter than the lower end. A baffle 140 includes a small diameter aperture 160 axially therethrough. The baffle 140 is disposed intermediate the ends of core 147 and separates the upper and lower portions of aperture 12. The baffle provides a seat for the plunger 112. The aperture 160 permits extraneous fluids to be removed from the core 147 via the aperture in bleed screw 136. The manual bleed screw 136 is adapted to threadably engage the internally threaded portion of aperature 128 in core 147. O-ring 162 provides a tight seal between bleed screw 136 and core 147. The bleed screw 136 includes an internal aperture 126. The aperture 126 of bleed screw 136 has an inverted L-shape which extends axially along the screw and out of the stem thereof. The aperture 126 is closed when bleed screw 136 is inserted into the core 147. When aperture 126 is closed (i.e., bleed screw 136 is fully inserted into core 147), water pressure is maintained so that the plunger 112 is positioned to open or close the valve in response to electrical signals sent through Wires 138 to coil 132.

Conversely, when bleed screw 136 is partially disengaged from core 147, water pressure is manually relieved so that the plunger 112 moves into aperture 128 and the valve is opened or spurious water in the solenoid is removed.

The plunger 112 is composed of a core 114 with a central, axial bore 125 therein. The bore can pass through the core 112. Typically, the bore 125 is threaded on the inner surface thereof. An adjustable head 118 includes a threaded portion thereof which is adjustably mounted within the bore of core 114.

In this embodiment, the head 118 is fabricated of a steel alloy threaded rod or "screw". However, the head 118 can also be plastic or the like. In a preferred construction, a nylon strip 122 is adhered along one side of the threaded portion of head 118. Typically, the nylon strip 122 is mounted in an aperture of appropriate size and shape at the surface of screw 118. In the preferred embodiment, the nylon strip extends along a substantial portion of the length of the screw 118. This arrangement permits a greater area of control and length of screw adjustment. Alternatively, a pellet or dot or a series of pellets or dots of nylon can be used. The nylon strip is nearly flush with the peak of the threads of screw 118 so as to make a suitable binding fit with core 114. Such fasteners are fabricated by Buckley QC Fasteners.

While the threads of the screw 118 alone are considered adequate to stabilize the screw within the plunger, the nylon strip 122 provides an additional means to secure the screw 118 once it has been adjusted Other suitable methods m be used to provide additional assurance that the position of the screw 118 will be maintained. For example, head 118 can be formed of plastic wherein the threads could be purposely distorted so as to provide the desired binding.

The head 118 is turned to adjust the height thereof relative to the core 114. Moreover, head 118 may be covered by rubber-like material to provide some flexibility as the plunger 112 moves within the solenoid body 150 and to provide a rubber seat to seal against the valve discharge port. When the head 118 of the plunger 112 is pushed against the valve discharge port (not shown), the valve is closed. Other material which has sufficient cushioning ability and durability may be used.

The core 114 of the plunger 112 is composed of alloy steel in this embodiment. However, other materials are contemplated which also contain sufficient ferrous matter to permit the plunger 112 to be electromagnetically attracted or "captured" by the magnetic field created by the coil within the solenoid body 150. The plunger core 114 can have an inner ferrous layer while the exterior is comprised of any durable and even non-ferrous material.

Although an alloy steel, screw-type head 118 is shown in this embodiment, other adjustable fasteners of suitable materials are contemplated. Likewise, fasteners such as notched pins, and the like may be utilized.

The configuration of the core 114 and spring 116 are such as to have the spring 116 positioned at one end of the core 114. Any number of methods and configurations would make this possible. In this embodiment, a slight depression or groove 107 is formed adjacent one end of the core 114. The groove 107 in the outer surface of core 114 produces a recess or neck for retaining the spring 116. A reduced diameter or tightened coiling of one or more turns of the spring 116 is used to hold the spring 116 in place in groove 107 on the core 114.

When the plunger 112 is inserted into the aperture 128 in the solenoid body 150, the larger end of spring 116 rests upon the inner shoulder 130 within the aperture 128. The spring 116 may prevent the base of the plunger 112 from contacting the bottom of the aperture 128 (i.e., baffle 140) when the plunger 112 is in its extended state. When the separation between the plunger 112 and the bottom of aperture 128 is maintained, the valve is closed.

Conversely, when coil 132 is activated by an electrical signal, an electromagnetic force is created which draws plunger 112 into aperture 128. As the plunger 112 moves inwardly, the spring 116 is compressed between the shoulder 130 and the upper end of core 114. This inward shift of the plunger 112, moves the head 118 off of the valve discharge port whereby the valve is forced open.

Although a coiled spring 116 is used in this embodiment to position the plunger 112 within the solenoid body, other flexible, expandable and/or compressible means which allow the movement of the plunger 112 are contemplated. The coiled spring 116 in this embodiment is composed of steel, but other resilient materials are contemplated.

Referring now to FIG. 3, plunger 112 and the measurement standard 200 of the instant invention are shown in side-by-side relation. The measurement standard 200 is composed of a tube 234 with a blind bore 280 therein. A piston 232 which is insertable into the bore 280 in the tube 234 includes a flathead 236. Both the tube and the piston may be manufactured of some plastic material such as delrin, nylon, ABS or the like.

The piston 232 is snugly slideable in the bore 280 within the tube 234. The thickness T of the flat head 236 is selected to be equal to the length of travel necessary for plunger 112 within the core 147 to allow the solenoid 100 to function in opening and closing the valve.

In order to determine the exact length of the adjustable plunger 112 for the solenoid under repair, the standard 200 is utilized. The piston 232 is extended as far as possible outwardly from the tube 234. The fully extended measurement standard 200 is positioned within the aperture 128 in the solenoid 100. The solenoid is assembled and positioned on the valve. As this is done, the piston 232 is compressed into the bore 280 in tube 234. The standard 200 now corresponds to the length of the interior space in core 147 when positioned on the valve.

The solenoid is removed from the valve and the measurement standard 200, maintaining the compressed length, is removed from the solenoid. The compressed measurement standard 200 is placed on a level surface next to the adjustable plunger 112. To achieve the proper height for the plunger 112 in this particular valve, the plunger 112 is adjusted so that the top surface of the head 118 is flush with the bottom surface of the flat head 236 of the piston 232, as shown in FIG. 3. The properly adjusted plunger 112 is now inserted into aperture 128 of the solenoid body 150 and assembled. The solenoid is then positioned onto the valve.

By this apparatus and procedure, the solenoid is an exact replacement for the valve of virtually any irrigation system. A similar apparatus and procedure is used for other fluid control systems which utilize a valve, solenoid, and an activation means to regulate the flow of the fluid.

Referring now to FIG. 4, there is shown a partially broken away and partially cross-sectional view of another embodiment of the instant invention. In this embodiment, similar components bear similar reference numerals.

The solenoid 400 shown in FIG. 4 includes a core 447 which is, generally, similar to the core 147 shown in FIGS. 1 and 2. In solenoid 400, the same coil and cannister arrangements can be utilized as in solenoid 100. However, as shown in FIG. 4, the coil 432 (including connecting wires 138) is a self-contained unit which can be an epoxy resin filled unit, with or without a cannister. This unit is or can be mounted directly onto the core 447. Of course, the coil can be removably mounted, if so desired. The core 447 includes the threaded base portion 434 as shown in FIGS. 1 and 2. Likewise, an adapter 415 is provided. The O-ring 116 is provided against the shoulder 139 and the O-ring 133 is provided between the base 434 and the adapter 415 in the same fashion as described above relative to the embodiment of FIG. 2. A plunger 412 with the appropriate coil spring 406 and the like is also provided. The plunger 412 comprises a head 118 which is adjustably mounted to base 114 in the same fashion shown and described above. The core 447 includes a first shoulder and the inner bore 428 into which the plunger 412 is mounted.

In this embodiment, the core 447 comprises a relatively small diameter axial bore 460 through the upper end thereof. That is, the upper end of the core 447 is a relatively solid piece contrary to the hollow core shown in FIG. 2. The outer surface of core 447 has a threaded portion 448 at the outer extension thereof and is adapted to receive a cap 436 which has a threaded inner surface. A washer 451 is mounted over the end of core 447 and secured in place by the cap 436. A gasket 449 is provided between the end of core 447 and the inner top surface of cap 436. The gasket 449 provides a seal between the cap and the core.

The aperture 464 passes through the side wall of cap 436. In order to bleed the solenoid, cap 436 is loosened sufficiently so that the cap is displaced from the end of core 447 thereby producing an open space between the core and the inner surface of the cap. When the aperture 464 n cap 436 communicates with the space between the cap and the core, any fluid in the core is able to bleed off.

As noted, the coil 432 is maintained in place by cap 436 in conjunction with washer 451. The holding washer 451 may be a flat type as shown, but other suitable types are possible such as wavy or spring washers, among others. If it is necessary to replace the coil 432, the bleed cap 436 is removed along with the washer 451. The coil 432 is then removed from the core 447, a new one replaced, and the washer 451 and cap 436 are replaced. This embodiment has the advantage of relatively lower cost of fabrication as well as a somewhat smaller size which is obtainable because of the omission of the cannister to secure the coil in the solenoid.

Thus, there is shown and described a preferred embodiment of the instant invention. Those skilled in the art may conceive of modifications or variations to the described embodiment Any such modifications or variations which fall within the purview of this description are intended to be illustrative only and are not intended to be limitative. Rather, the scope of the invention is limited only by the claims appended hereto.

We claim:

1. A solenoid comprising,
    core means,
    said core means including an inner bore extending from one end for said core means for a portion thereof,
    plunger means moveably disposed within said inner bore in said core means,
    coil means mounted around said core means,
    said core means including shoulder means integrally formed thereon for supporting said coil means,
    bleed control means integrally formed at the other end of said core means,
    said bleed control means including an aperture which extends axially through said core means and communicates with said inner bore in said core means in which said plunger means is moveably disposed, and
    cap means adjustably mounted to said other end of said core means and including an aperture therethrough for selectively communicating with said aperture in said bleed control means.
2. The solenoid recited in claim 1 including,
    housing means for supporting said coil means.
3. The solenoid recited in claim 1 wherein,
    said coil means is removable from said core means.
4. The solenoid recited in claim 1 including,
    resilient means mounted to said plunger and said core to produce relative motion therebetween.
5. The solenoid recited in claim 1 wherein,
    said plunger means is adjustable in the length thereof.
6. The solenoid recited in claim 1 wherein,
    said cap means is threadedly mounted to said core means.
7. The solenoid recited in claim 1 wherein,
    said cap means includes an elongated end thereof which extends into the aperture of said bleed control means.
8. The solenoid recited in claim 7 wherein,
    said aperture in said cap means extends axially through at least a portion of said elongated end.
9. The solenoid recited in claim 8 wherein,
    said aperture in said cap means extends radially through said elongated end of said cap means.
10. The solenoid recited in claim 1 wherein, said core means includes a threaded end thereof with which said cap means is engaged.

11. The solenoid recited in claim 10, wherein,
said aperture in said cap means extends through a side of said cap means whereby said aperture in said cap means selectively communicates with the inner bore of said core means.

12. The solenoid recited in claim 10 including,
gasket means mounted within said cap means and selectively abutted by said other end of said core means when said cap means is threadedly engaged with said core means.

13. The solenoid recited in claim 4 wherein,
said resilient means is a coiled spring.

14. The solenoid recited in claim 5 wherein,
said plunger means includes a body member and an extension member threadedly engaged to said body member.

15. The solenoid recited in claim 14 including,
securing means intermediate said body member and said extension member to inhibit relative movement thereof.

16. The solenoid recited in claim 1 including,
baffle means in said core means between said inner bore and said bleed control means.

17. The solenoid recited in claim 16 wherein,
said baffle means includes an aperture therethrough.

18. The solenoid recited in claim 1 including,
adapter means selectively mounted on said core means for adapting said solenoid for sue with different size fittings.

19. The solenoid recited in claim 1 including,
securing means mounted over said core means and intermediate said cap means and said coil means for securing said coil means on said core means.

20. The solenoid recited in claim 1 wherein,
said coil means is potted in a suitable resin-type material to provide a stand-alone coil unit.

* * * * *